United States Patent [19]

Welschof

[11] Patent Number: 5,199,925
[45] Date of Patent: Apr. 6, 1993

[54] TRIPOD UNIVERSAL JOINT WITH INTERMEDIATE ROLLER ELEMENTS

[75] Inventor: Hans-Heinrich Welschof, Rodenbach, Fed. Rep. of Germany

[73] Assignee: Löhr & Bromkamp GmbH, Offenbach am Main, Fed. Rep. of Germany

[21] Appl. No.: 609,240

[22] Filed: Nov. 5, 1990

[30] Foreign Application Priority Data

Nov. 3, 1989 [DE] Fed. Rep. of Germany ....... 3936600

[51] Int. Cl.⁵ .............................................. F16D 3/20
[52] U.S. Cl. ...................... 464/111; 464/122; 464/132; 464/905
[58] Field of Search ............... 464/111, 123, 132, 122, 464/120, 905

[56] References Cited

U.S. PATENT DOCUMENTS

| | | | |
|---|---|---|---|
| 4,255,945 | 3/1981 | Alexandre | 464/111 |
| 4,501,571 | 2/1985 | Orain | 464/132 X |
| 4,589,856 | 5/1986 | Mazziotti et al. | 464/111 |
| 4,747,803 | 5/1988 | Kimata et al. | 464/111 |
| 4,768,994 | 9/1988 | Stenglein | 464/111 |
| 4,881,923 | 11/1989 | Orain | 464/111 |
| 4,904,227 | 2/1990 | Sasaki et al. | 464/111 |

FOREIGN PATENT DOCUMENTS

| | | |
|---|---|---|
| 2748044 | 5/1978 | Fed. Rep. of Germany . |
| 2831044 | 10/1979 | Fed. Rep. of Germany . |
| 3308636 | 10/1983 | Fed. Rep. of Germany . |
| 55-36614 | 3/1980 | Japan .................................. 464/111 |
| 59-40016 | 3/1984 | Japan .................................. 464/111 |
| 61-175320 | 8/1986 | Japan .................................. 464/111 |
| 62-20225 | 2/1987 | Japan .................................. 464/111 |
| 1-288626 | 11/1989 | Japan .................................. 464/111 |
| 2018393 | 10/1979 | United Kingdom . |
| 2070195 | 9/1981 | United Kingdom . |
| 2226102 | 6/1990 | United Kingdom . |

*Primary Examiner*—Daniel P. Stodola
*Assistant Examiner*—William G. Battista, Jr.
*Attorney, Agent, or Firm*—Anderson Kill Olick & Oshinsky

[57] ABSTRACT

A universal joint of the tripod type comprising an outer joint member (1) in the form of a sleeve with three internal axis-parallel recesses (2) each with circumferentially opposed track pairs (3, 4), an inner joint member (7) with three arms (8) extending into the recesses, intermediate elements (12) pivotally supported on the arms, and rollers (15) guided in the tracks in the recesses and running on rolling members (14) carried by the intermediate elements, wherein the arms of the inner joint member have part-spherical surfaces (10, 11) facing the tracks in the outer joint member, the intermediate elements are non-rotatably held on the arms and have part-spherical internal surfaces engaging the part-spherical surfaces of the arms, and the rollers are displaceable radially of the joint on the rolling members carried by the intermediate elements as well as being rotatable thereabout.

5 Claims, 2 Drawing Sheets

TRIPOD UNIVERSAL JOINT WITH INTERMEDIATE ROLLER ELEMENTS

BACKGROUND TO THE INVENTION

1. Field of the Invention

This invention relates to a universal joint of the tripod type, comprising an outer joint member in the form of a sleeve having a rotational axis and three internal axis-parallel recesses, each recess comprising a pair of tracks opposing one another in the direction circumferentially of the joint member; an inner joint member disposed within the outer joint member and having three arms extending into the recesses of the outer joint member; the arms each carrying a roller and an intermediate element, the intermediate elements being pivotably supported on the arms, and the rollers being guided in the pairs of tracks of the corresponding recesses and running on rolling members carried by the intermediate members. In such a tripod joint, which will hereafter be referred to for convenience as a tripod joint of the kind specified, the inner and outer joint members are able to move axially relative to one another, the rollers moving along the tracks in the recesses, as well as to undergo relative articulation.

2. Description of Prior Art

Tripod joints of the kind specified are disclosed in GB-2018393B and GB-2070195B. In these joints, each of the arms of the inner joint member is of cylindrical configuration and an inner ring is radially movable thereon, the inner ring having an external part-spherical surface which engages an internal part-spherical surface of an intermediate member. The intermediate member has an external cylindrical surface which forms the inner race of a needle roller bearing, the roller with its internal bore forming the outer race of the needle roller bearing. It is necessary to provide at least one ring for radially holding the intermediate member and roller together, and thus the joint is of a relatively complicated design comprising a large number of separate components.

SUMMARY OF THE INVENTION

It is broadly the object of the present invention to provide a tripod joint of the kind specified which, while retaining satisfactory function, is of simpler design than the joints above referred to.

According to the present invention, in a tripod joint of the kind specified the arms of the inner joint member are provided, at their sides facing the tracks in the corresponding recesses, with part-spherical surfaces; the intermediate elements have part-spherical internal surfaces engaging therewith and are held on the arms so as to be non-rotatable thereon, and the rollers are radially slidable on the rolling members, relative to the intermediate members.

In a joint according to the invention, because the intermediate elements are held non-rotatably on the arms of the inner joint member, the axial movement of the rollers in the tracks of the outer joint member takes place in the form of clean rolling movements. The necessary pivoting or tilting of the rollers relative to the arms when the joint is articulated occurs exclusively between the intermediate elements and the arms, and the radial movement of the rollers relative to the arms takes place at the roller bearing interface provided by the rolling elements between the rollers and intermediate elements. The rolling elements are preferably needle roller bearings.

In a first embodiment of the invention, the intermediate elements are divided in the axial direction of the joint, and enclose head portions of the arms which, as well as their part-spherical surfaces, have flattened surfaces (which face axially of the inner joint member). Such a divided intermediate element may be produced by machining it to the required configuration and then fracturing it. The internal configuration of the intermediate element includes, as well as the part-spherical faces, flats which cooperate with the flattened surfaces of the arm, so that the intermediate element is non-rotatable on its arm.

In another embodiment of the invention, the arms may have flattened head portions provided with said part-spherical surfaces, and the intermediate elements have recesses which enable them to be placed on the head portions of the arms while turned through 90° about the respective axes of the arms from their operative position, whereafter the arms can be turned to their operative positions in which their internal part-spherical surfaces engage the part-spherical surfaces of the arms. In the assembled joint, the intermediate elements cooperate with the outer joint member to prevent them from rotating on the arms, the intermediate elements having formations which engage the outer joint member to achieve this. There is no need to fracture the intermediate elements in this case.

The rolling elements, which preferably are needle rollers as above referred to, are preferably held in a track in each intermediate element so as to prevent them from moving radially of the joint relative to the intermediate elements. Cages may be provided to prevent any tilting of the rolling elements. The rollers each have an internal cylindrical face which enables radial displacement relative to the rolling elements. The cross-sectional shapes of the rollers and tracks in the outer joint member may be adapted to cooperate with one another to prevent the rollers from tilting relative to the outer joint member, which can eliminate the requirement for special roller guiding formations or the like.

BRIEF DESCRIPTION OF DRAWINGS

The invention will now be described by way of example with reference to the accompanying drawings, of which.

DESCRIPTION OF PREFERRED EMBODIMENTS

Figure 1:
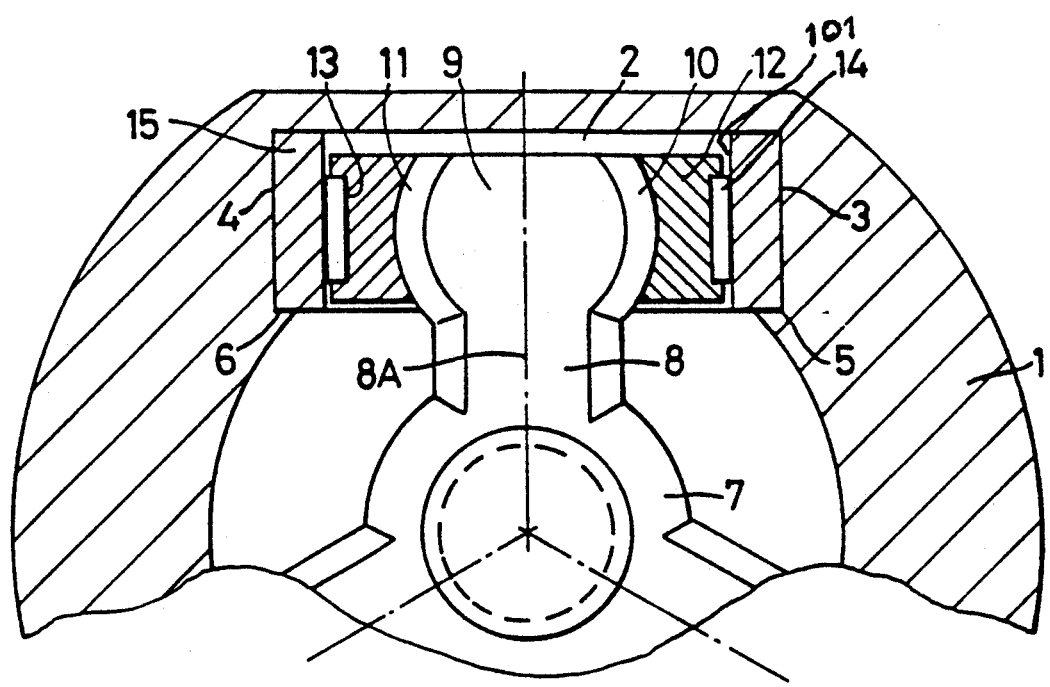
FIG. 1 is part of a radial section through a first embodiment of joint according to the invention.

Referring firstly to FIG. 1 of the drawings, the joint there illustrated comprises an outer joint member 1. The outer joint member is in the form of a sleeve, in whose hollow interior there are three equally circumferentially spaced axially extending recesses of which one is shown in the drawing at 2. Each recess comprises a pair of tracks 3, 4 opposed to one another circumferentially of the joint member. The tracks 3, 4 comprise flat surfaces, and are bounded by guiding edges 5, 6 at the interior of the joint member.

An inner joint member 7 is disposed within the outer joint member and comprises three arms 8 which extend radially outwardly into the recesses of the outer joint member. The illustrated arm 8 which extends into the recess 2 ends in a head portion 9 which has part-spherical surfaces 10, 11 facing in opposite directions circumferentially of the joint, and flat surfaces 16, 17 which face in opposite directions axially of the joint.

An intermediate element 12 is received on the head portion 9 of the arm 8, the intermediate element having an internal shape with part-spherical surface portions which are complementary to the part-spherical surfaces 10, 11 of the head portion 9, and flat portions which face the flat surfaces 16, 17 but are spaced therefrom to form recesses 18 between the intermediate element 12 and the flat surfaces 16, 17. The intermediate element is thus able to articulate in the sense of tilting or pivoting on the head portion of the arm, but is not able to rotate completely thereabout. The intermediate element 12 comprises two parts, being divided in a plane 100 extending axially of the joint, to enable it to be fitted on to the head portion 9. Such an intermediate element may be made by machining it to its required configuration and then fracturing it into its two parts.

The external circumferential surface of the intermediate element 12 is provided with a bearing track 13 holding rolling elements in the form of needle roller bearings 14. A roller 15, with a cylindrical internal surface 101, is received on the needle roller bearings 14, so that it is able to rotate about the intermediate element and move relative thereto in the direction radially of the joint as a whole, i.e. lengthwise of the arm 8. The external surface of the roller 15 engages the opposed tracks 3, 4 in the outer joint member and is constrained by the guiding edges 5, 6 to roll therealong and not tilt relative to the outer joint member.

Figure 2:
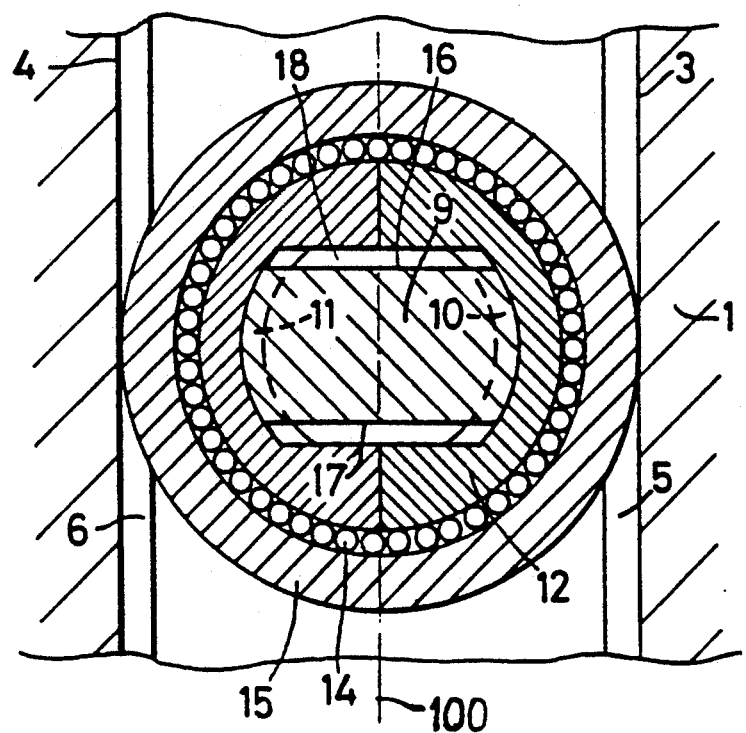
FIG. 2 is a tangential section through the roller assembly of the joint of FIG. 1.
Figure 3:
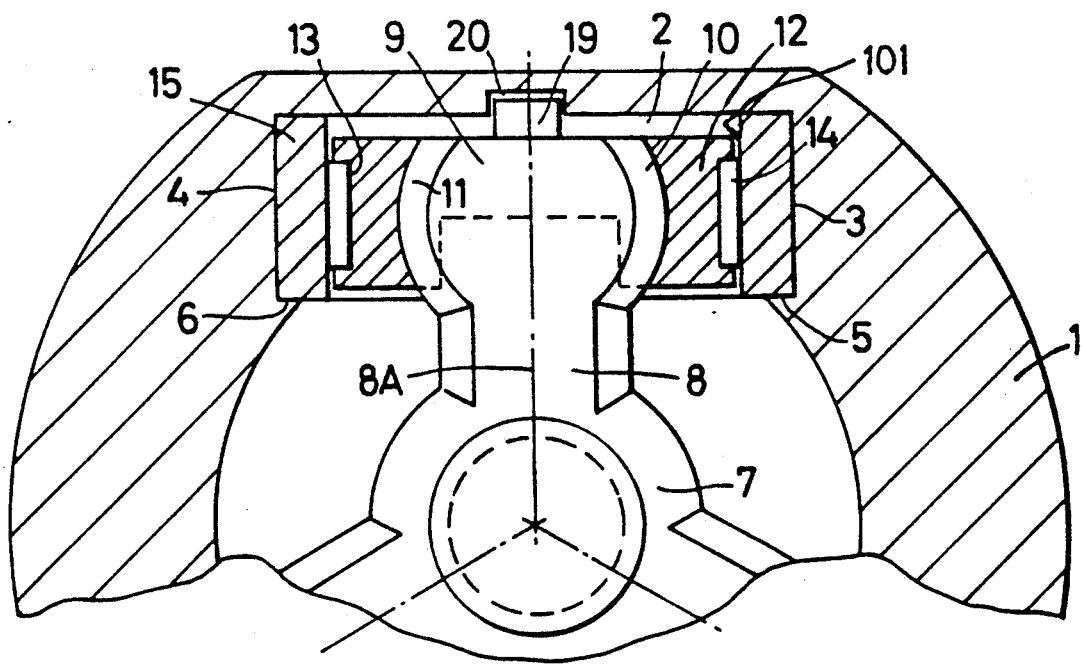
FIGS. 3 and 4 are respectively radial and tangential sections as FIGS. 1 and 2 but through a further embodiment of joint according to the invention.
Figure 4:
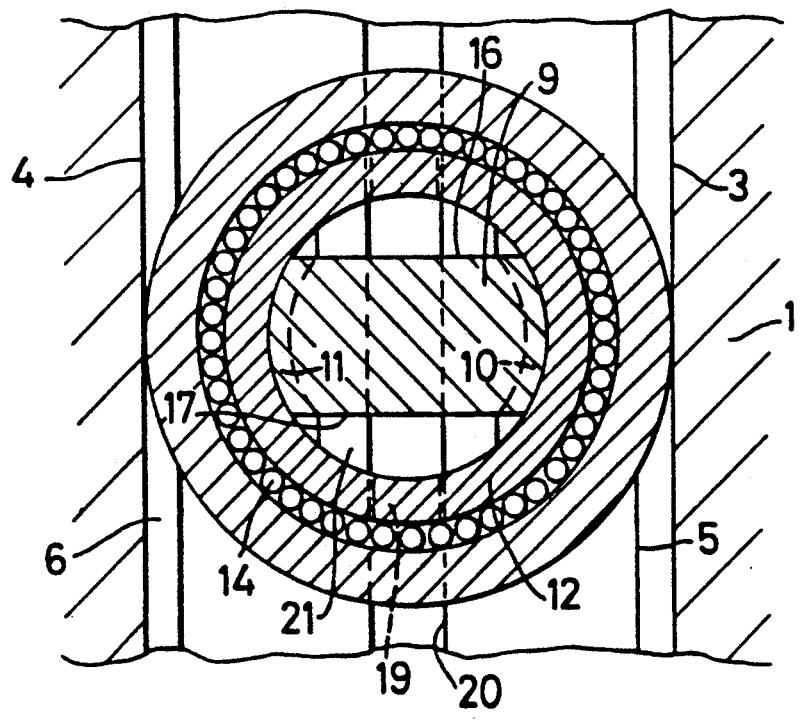

Referring now to FIGS. 3 and 4 of the drawings, these show a further embodiment of joint according to the invention, in which parts corresponding to those in the joint of FIGS. 1 and 2 are identified by the same reference numerals. Thus, this embodiment of joint likewise comprises an outer joint member 1 of which a recess 2 therein is shown, and opposed tracks 3, 4 in the recess with guiding edges 5, 6. The inner joint member 7 has an arm 8 with head portion 9 having opposed part-spherical faces 10, 11 and flat surfaces 16, 17. There is an intermediate element 12 with part-spherical surfaces complementary to the surfaces 10, 11 of the head portion 9, the intermediate element having a bearing track 13 holding needle roller bearings 14 and a roller 15 having a cylindrical internal surface 101 supported on such bearing and engaging the tracks 3, 4.

In this embodiment, however, instead of being in two parts the intermediate element 12 has a recess 21 which enables the intermediate element, when turned through 90° from the illustrated position about the axis indicated at 8A of the arm 8, to be fitted over the head portion 9 of the arm. When thus fitted, the intermediate element can be turned to the illustrated operative position wherein its internal part-spherical surfaces engage with the surfaces 10, 11 so that it is retained on the arm but able to pivot thereon. The intermediate element has a pair of lugs 19 which engage in a groove 20 formed in the recess 2 in the outer joint member, so that in the assembled joint the intermediate element cannot rotate about the arm 8 to reach the position in which it can be removed therefrom.

The groove 20 is shown in FIG. 4 although it is actually positioned above the plane in which the FIG. 4 section is taken.

In both the above described embodiments of joint, therefore, the necessary tilting or pivoting of the rollers 15 relative to the inner joint member when the joint articulates and is rotated in the articulated condition, takes place between the intermediate elements and the head portions of the arms. The necessary movement of the rollers axially of the arms takes place at the internal surface of the rollers where they engage the needle roller bearings 14. At the same time, the rollers can freely rotate about the bearings to roll along the tracks in the outer joint member.

I claim:

1. A tripod universal joint, comprising:
    an outer joint member in the form of a sleeve having a rotational axis and three internal axis-parallel recesses;
    each recess comprising a pair of tracks opposing one another on the direction circumferentially of the joint member;
    an inner joint member disposed with other outer joint member and having three arms extending into the recesses of the outer joint member;
    the arms of the inner joint member having part-spherical surfaces at their sides facing the tracks in the outer joint member and flatten head portions between said part-spherical surfaces;
    intermediate elements having part-spherical internal surfaces engaging said part-spherical surfaces of the arms when the intermediate elements are in their operative position so as to be able to pivot freely relative to the arms about axes parallel and transverse to the joint member axes, and having recesses which enable the intermediate elements to be placed on the head portions when said intermediate elements are turned from their operative positions about the respective axes of the arms;
    matching formations on the intermediate elements and the outer joint member which inter-engage in the assembled joint to prevent the intermediate elements from rotating completely about said arms;
    rolling elements mounted on an external circumferential surface of said intermediate elements;
    rollers provided so as to engage said rolling elements and so that said rolling elements are between said intermediate elements and said rollers, and being slidable radially on the rolling elements relative to the intermediate elements; and
    means for guiding said rollers to roll on said pairs of tracks while preventing tilting of the rollers relative to the outer joint member.

2. A joint according to claim 1, wherein said complementary formations comprises lugs on the intermediate members engaging groove means in the outer joint member.

3. A joint according to claim 1, and further comprising means for holding the rolling elements against movement radially of the joint relative to the intermediate elements, the rollers having cylindrical internal surfaces engaging the rolling elements.

4. A tripod universal joint, comprising:
    an outer joint member in the form of a sleeve having a rotational axis and three internal axis-parallel recesses;

each recess comprising a pair tracks opposing one another in the direction circumferentially of the joint member;

an inner joint member disposed within the outer joint member and having three arms extending into the recesses of the outer joint member;

the arms of the inner joint member having part-spherical surfaces at their sides facing the tracks in the outer joint member and flattened head portions facing the ends of said axis-parallel recesses between said part-spherical surfaces;

intermediate elements having part-spherical internal surfaces engaging said part-spherical surfaces of the arms so as to be able to pivot freely relative to the arms about axes parallel and transverse to the joint member axes and flat surfaces opposed to said flattened head portions to prevent said intermediate elements from rotating completely about said arms, said flattened head portions being axially spaced from said flat surfaces when the joint is aligned;

each said intermediate element comprising two parts and being divided in the axial direction of the joint;

rolling elements mounted on an external circumferential surface of said intermediate elements;

rollers provided as to engage said rolling elements and so that said rolling elements are between said intermediate elements and said rollers, and being slidable radially on the rolling elements relative to the intermediate elements; and means for guiding said rollers to roll on said pairs of tracks while preventing tilting of the rollers relative to the outer joint member.

5. A joint according to claim 4, and further comprising means for holding the rolling element against movement radially of the joint relative to the intermediate elements, the rollers having cylindrical internal surfaces engaging the roller elements.

* * * * *

UNITED STATES PATENT AND TRADEMARK OFFICE
CERTIFICATE OF CORRECTION

PATENT NO. : 5,199,925
DATED : April 6, 1993
INVENTOR(S) : Hans-Heinrich Welschof It is certified that error appears in the above-identified patent and that said Letters Patent is hereby corrected as shown below:

Claim 1, column 4, line 24 should read
--with the outer joint--.

Signed and Sealed this

First Day of February, 1994

Attest:

BRUCE LEHMAN

Attesting Officer    Commissioner of Patents and Trademarks